UNITED STATES PATENT OFFICE.

WILLIS W. FRANTZ, OF WAYNESBOROUGH, PENNSYLVANIA.

PROCESS OF PRESERVING LIME.

SPECIFICATION forming part of Letters Patent No. 412,247, dated October 8, 1889.

Application filed April 4, 1889. Serial No. 305,982. (No specimens.)

*To all whom it may concern:*

Be it known that I, WILLIS W. FRANTZ, a citizen of the United States, residing at Waynesborough, in the county of Franklin, State of Pennsylvania, have invented certain new and useful Improvements in the Process of Preserving Lime, of which the following is a specification:

The object of my invention is the provision of a method of treatment of ordinary quicklime, whereby the same is preserved in its primitive state of purity and is kept always ready for use, being in such a state of chemical purity that it can be used with the greatest certainty in manufacturing, medical, and chemical operations, there being no variation of strength to affect the proportions of the same when used with other ingredients.

The objection frequently incident to the use of lime under all circumstances is that the percentage of moisture and air-slaked or carbonized lime therein is never fully determinable, as the air is constantly increasing the same. Thus the longer lime is kept in the quick state the longer time there is for the absorption of moisture and the air-slaking process. This deteriorates the lime and makes its value much less for use, especially in disinfecting operations and where a pure quality of lime is desired.

In order to preserve the lime absolutely dry, then, and to prevent recarbonization or air-slaking, I treat the lime as follows: As the lumps of quicklime come out of the kiln, hot and newly calcined, they are removed quickly to a crusher, where they are reduced to powder or a conveniently-small size for packing into cans, falling below the crusher into cans or other vessels, into which they can be secured absolutely hermetically. These vessels may be made of sheet metal soldered, or of any other material conveniently rendered air tight. One of these vessels being filled, and so quickly as not to allow the lime to fall to the temperature of the surrounding atmosphere, it is closed and soldered or otherwise secured and the lime thus kept until ready for use. It is of the first importance that the lime be boxed up hot, as otherwise it will have had time to absorb a large quantity of moisture from the air and will deteriorate despite the preparation, as above described.

It is best to heat the lime only in the form of limestone in the process of calcining, as there is thus no heat wasted, and there can be no possibility of the air-slaking otherwise incident to all quicklime.

I do not wish to be understood as claiming, in any way, the cans or any arrangement of them, but solely and only the herein-described process of treatment of the lime, whereby it may be preserved in a state of chemical purity and thus be rendered doubly valuable through the obviation of difficulties hitherto considered inseparable from its use.

Although the preferred method is the treatment of the lime by taking it directly from the lime-kiln when freshly calcined, I do not limit myself to this method altogether, as it is quite as possible to heat and recalcine the lime, after previous calcination, as to heat and calcine it for the first time, and to treat the same as above described when thus heated.

What I claim is—

1. The herein-described process of treating lime, consisting in removing it while hot from the kiln, securing it in boxes, and hermetically sealing said boxes while the lime is hot, substantially as described.

2. The herein-described process of treating lime, consisting in removing the same while hot from the kiln, grinding it, and catching it in boxes, and then hermetically sealing said boxes while the lime is hot, substantially as described.

3. The herein-described process of treating lime, consisting in heating the same and boxing it in a hot state in hermetically-sealed vessels, substantially as described.

4. The herein-described process of treating lime, consisting in heating the quicklime, reducing it to powder, putting it into boxes while hot, and hermetically sealing said boxes while the temperature of the lime is above that of the surrounding atmosphere, substantially as described.

In testimony whereof I affix my signature in presence of two witnesses.

WILLIS W. FRANTZ.

Witnesses:
B. H. FORMAN,
ALF. N. RUSSELL.